(12) United States Patent
Griessbaum et al.

(10) Patent No.: US 7,640,799 B2
(45) Date of Patent: Jan. 5, 2010

(54) POTENTIAL SEPARATION FOR FILL LEVEL RADAR

(75) Inventors: Karl Griessbaum, Muehlenbach (DE); Josef Fehrenbach, Haslach (DE); Daniel Schultheiss, Hornberg (DE)

(73) Assignee: Vega Grieshaber KG, Wolfach (DE)

( * ) Notice: Subject to any disclaimer, the term of this patent is extended or adjusted under 35 U.S.C. 154(b) by 382 days.

(21) Appl. No.: 11/496,344

(22) Filed: Jul. 31, 2006

(65) Prior Publication Data

US 2007/0028829 A1 Feb. 8, 2007

Related U.S. Application Data

(60) Provisional application No. 60/705,597, filed on Aug. 4, 2005.

(30) Foreign Application Priority Data

Aug. 4, 2005 (DE) ........................ 10 2005 036 715

(51) Int. Cl.
*G01F 23/28* (2006.01)
(52) U.S. Cl. .................................... 73/290 V
(58) Field of Classification Search ................ 73/290 V
See application file for complete search history.

(56) References Cited

U.S. PATENT DOCUMENTS

| | | |
|---|---|---|
| 5,872,494 A | 2/1999 | Palan et al. |
| 6,469,676 B1 | 10/2002 | Fehrenbach |
| 6,778,044 B2 | 8/2004 | Fehrenbach |
| 7,328,611 B2 * | 2/2008 | Klees et al. ................ 73/290 V |
| 2001/0047685 A1 | 12/2001 | Lubbers |
| 2002/0066314 A1 | 6/2002 | Lubbers |
| 2002/0067229 A1 | 6/2002 | Lubbers |
| 2002/0135508 A1 | 9/2002 | Kleman |
| 2003/0151560 A1 | 8/2003 | Kienzle et al. |
| 2006/0000274 A1 * | 1/2006 | Kallsand et al. ........... 73/290 V |
| 2006/0017640 A1 | 1/2006 | Kienzle |

FOREIGN PATENT DOCUMENTS

| | | |
|---|---|---|
| DE | 196 17 963 | 11/1997 |
| DE | 100 60 069 | 4/2002 |
| DE | 100 57 441 | 5/2002 |
| DE | 100 60 068 | 6/2002 |
| DE | 103 02 112 | 7/2003 |
| DE | 10 2004 035 083 | 2/2006 |
| EP | 0 882 955 | 12/1998 |
| EP | 1 058 341 | 12/2000 |
| WO | WO 03/046491 | 6/2003 |
| WO | WO 2005/038414 | 4/2005 |

* cited by examiner

*Primary Examiner*—Hezron Williams
*Assistant Examiner*—Rodney T Frank
(74) *Attorney, Agent, or Firm*—Fay Kaplun & Marcin, LLP

(57) ABSTRACT

For safety reasons the potential of an electrical supply line of a radar sensor may be separated from the potential of the fill level container. A fill level radar with potential separation includes a separation element for insulating the aerial from a feed device. The separation element is arranged directly at the aerial, or forms part of the aerial. In this way insulation of the aerial from the exterior of the container is provided.

27 Claims, 3 Drawing Sheets

POTENTIAL SEPARATION FOR FILL LEVEL RADAR

REFERENCE TO RELATED APPLICATIONS

This application claims the benefit of the filing date of U.S. Provisional Patent Application No. 60/705,597 filed Aug. 4, 2005, and of German Patent Application 10 2005 036 715.1 filed Aug. 4, 2005, the disclosures of which are hereby incorporated herein by reference.

FIELD OF THE INVENTION

The present invention relates to fill level measuring. In particular, the present invention relates to a fill level radar with potential separation for determining the fill level in a tank, to an aerial, and to method for determining the fill level in a tank.

TECHNOLOGICAL BACKGROUND

For considerations relating to measuring technology and for safety reasons the potential of the electrical supply line of a radar sensor may be separated from the potential of the, often metallic, fill level container. This may for example result in a reduction in noise effects during measuring, and to a reduction in the susceptibility to interference of the measuring signals. Furthermore, such insulation may result in increased safety, for example in relation to avoiding fires that may occur as a result of a short circuit or a defect in the electrical supply line or in the electronics of the fill level radar. Thus, undesirable spark-over could, for example, lead to ignition of, or damage to, the feed material.

Furthermore, such insulation may be used for thermal separation of the feed material from the electronics, which may be necessary in particular in the case of large temperature differences between the interior of the tank and the surroundings of the tank.

WO 2005/038414 relates to a method and a device for insulating a fill level radar. To this effect the electrical insulator is arranged so as to be across an open end of a waveguide (in the following also named hollow conductor). The other end of the hollow conductor feeds the aerial. The insulator is located directly at the electronics, or it separates the hollow conductor into a lower hollow conductor and an upper hollow conductor.

SUMMARY OF THE INVENTION

According to an exemplary embodiment of the present invention a fill level radar with potential separation for determining a fill level in a tank is provided, comprising an aerial for transmitting and/or receiving electromagnetic waves, a feed device for feeding the electromagnetic waves to the aerial, and a separation element for insulating the aerial from the feed device, wherein the separation element is arranged directly at the aerial.

In this way potential separation may be provided directly between the aerial and the hollow conductor. Thus the aerial, which is for example arranged in the interior of a feed material container, is insulated from the hollow conductor, which is for example arranged outside the fill level container. Thus, among other things, insulation between the interior of the container and the exterior of the container is provided.

According to a further exemplary embodiment of the present invention, the separation element is designed to electrically insulate the aerial from the feed device up to a defined voltage. For example, the separation element is dimensioned such that adequate electrical insulation up to a defined maximum voltage is ensured.

Furthermore, according to another exemplary embodiment of the present invention the separation element is designed to thermally insulate the aerial from the feed device. This may, in particular, for example be of advantage in cases where the thermal conditions in the interior of the tank are to be kept constant and insulated from external thermal influences. In particular in the case of large temperature differences between the interior of the container and the exterior of the container such thermal insulation may result in considerable advantages.

Likewise, in cases where the temperatures in the container are extreme it may be advantageous to largely keep these temperatures away from the electronics so as not to risk any temperature-related influence of the function, or even failure of the electronics.

According to a further exemplary embodiment of the present invention the feed device comprises a hollow conductor (waveguide) and a radiation source, wherein the radiation source is designed to generate the electromagnetic waves, and wherein the hollow conductor is designed to conduct the electromagnetic waves from the radiation source to the aerial.

Thus the aerial is connected to the radiation source by way of a hollow conductor, wherein the hollow conductor and the aerial are insulated from each other by the separation element. Such insulation may be both electrical and thermal.

According to a further exemplary embodiment of the present invention the separation element comprises a dielectric. Such a dielectric may be good electrical insulation characteristics and most of the time may also provide for satisfactory thermal insulation characteristics and may in particular be suitable for the creation of insulating layers.

According to a further exemplary embodiment of the present invention the separation element is a dielectric barrier, comprising a layer of solid dielectric material.

Such layers can be produced easily and feature good electrically insulating characteristics as well as good breakdown voltages.

According to a further embodiment of the present invention a connection between the separation element and the feed device or between the separation element and the aerial is made in such a way that the feed device is held so as to be rotatable relative to the aerial. In this way, for example, rotatability between the sensor housing with inbuilt circuit and the aerial subassembly may be provided. This may improve the flexibility of the fill level radar since changing environmental conditions or installation conditions may often require other sensor housing positions.

Furthermore, depending on interfering container installations, which apart from the fill level surface to be measured may also generate reflections and thus make measuring more difficult, it may often be advantageous to be able to rotate the polarisation of the electromagnetic wave transmitted from the aerial. By way of this polarisation rotation certain undesired reflections may be minimized so that in this way measuring the feed material becomes more reliable and more accurate. Up to now it has been customary, to this effect, to rotate the complete fill level sensor in its installed position. In the case of sensors with a flange attachment this means that all installation screws of the flange have to be undone and, corresponding to the hole division of the flange, to rotate this flange for example in 90°- or 60°-steps. In this way fine adjustment of the polarisation beyond the incremental width defined by the hole division is not possible.

In the case of sensors with a screw-in thread the polarisation rotation has to take place by corresponding rotation of the screw-in thread, which, while being possible at correspondingly fine increments, can however be problematic from the point of view of the sealing function of the thread.

By means of the rotatability, proposed in the present invention, between the separation element and the feed device, or between the separation element and the aerial, a polarisation rotation may take place without the need to rotate the aerial, which normally is firmly mechanically connected to the flange or the screw-in thread.

In the case of an unchanged position of the flange attachment or of the screw-in thread the polarisation may be rotated by rotating the feed device, perhaps coupled with the sensor housing, at any desired fineness, without any installation effort and without impeding the container seal.

According to a further exemplary embodiment of the present invention the connection between the separation element and the feed device or between the separation element and the aerial is designed so as to be unclippable.

By designing the fill level radar with an undoable unclippable connection, by means of which the entire upper part of the fill level radar may be pulled from the aerial, the electronics together with the hollow conductor (if present) may simply be removed or exchanged. This may enhance the flexibility of the radar, in particular in the case of repair or maintenance because deinstallation of the upper (external) component subassembly may be possible in a simple manner without the flange having to be removed from the aerial or the aerial having to be undone in some other way from the cover of the fill level container.

According to a further exemplary embodiment of the present invention the connection between the separation element and the feed device or between the separation element and the aerial is gasproof or waterproof.

In this way, materials transport between the tank on the side of the aerial and the external environment on the side of the feed device may be prevented. It may thus, for example, be possible to prevent corrosion or some other damage or destruction of the fill level radar above the aerial. Furthermore, in this way the undesirable infeed of solid, liquid or gaseous materials into the tank may be prevented. Moreover, it may be possible to avoid pressure equalisation between the interior of the tank and the exterior of the tank.

According to a further exemplary embodiment of the present invention the fill level radar further comprises a measuring circuit for generating microwave signals that are transmitted by way of the aerial, and/or for measuring electromagnetic waves that are received by the aerial, wherein the measuring circuit is at least partially combined with the separation element.

By at least partially combining the measuring circuit with the separation element, space may be saved.

According to a further exemplary embodiment of the present invention the aerial is designed as a horn aerial or a parabolic aerial. In this way it may be possible to insulate various aerials from the potential of the feed device or to thermally separate them from it.

According to a further exemplary embodiment of the present invention the hollow conductor is designed as a round hollow conductor or a rectangular hollow conductor.

According to a further exemplary embodiment of the present invention the aerial is designed as a parabolic aerial, wherein the feed device comprises a hollow conductor with a first region. In this arrangement the first region of the hollow conductor protrudes into the parabolic aerial, wherein the separation agent partly encases the hollow conductor.

Thus, by means of the separation element, the hollow conductor which feeds the aerial may be insulated from the parabolic aerial and from an attachment flange connected to said parabolic aerial.

According to a further exemplary embodiment of the present invention the separation element completely encases the first region of the hollow conductor. In this way complete insulation of the hollow conductor that feeds the aerial may be provided by a complete envelope, for example a dielectric envelope.

According to a further exemplary embodiment of the present invention an aerial for transmitting and/or receiving electromagnetic waves is stated, wherein the aerial comprises a separation element for insulating the aerial from a feed device. The feed device is designed for feeding electromagnetic waves to the aerial.

According to this exemplary embodiment of the present invention the separation element forms part of the aerial, as a result of which insulation of the aerial from the feed device that is connected to said aerial may be ensured.

Such an aerial may be used as a modular component for a fill level radar, wherein insulation between the aerial and the electronics is ensured, even if different electronics and waveguides are used.

According to a further exemplary embodiment of the present invention the separation element is designed for thermal insulation of the aerial from the feed device or (up to a defined electrical voltage) for electrical insulation of the aerial from the feed device. Furthermore, the separation element may comprise a dielectric, for example in the form of a dielectric barrier, comprising a layer of a solid dielectric material.

In particular, the aerial may be held so as to be rotatable relative to the feed device, wherein the separation element forms part of the bearing arrangement.

Furthermore, a method for determining the fill level in a tank is stated, in which method feeding electromagnetic waves to an aerial takes place. Furthermore, the electromagnetic waves are transmitted and/or received by the aerial, and insulation of the aerial from the feed device takes place by a separation element, wherein the separation element is arranged directly at the aerial.

In this way a method is provided by which the fill level in a tank may be determined, wherein potential separation between an (external) feed device and electronics that are connected to it on the one hand, and an aerial (internal to the fill level tank) on the other hand may be made possible. In this arrangement, potential separation may take place directly at the aerial.

According to a further exemplary embodiment of the present invention the electromagnetic waves are generated by a radiation source and are guided from the radiation source to the aerial by way of a hollow conductor. In this arrangement the hollow conductor and the radiation source form part of the feed device and are thus insulated from the aerial by means of the separation element.

Further exemplary embodiments of the present invention are stated in the subordinate claims.

BRIEF DESCRIPTION OF THE DRAWINGS

Below, preferred exemplary embodiments of the present invention are described with reference to the figures.

DETAILED DESCRIPTION OF EXEMPLARY EMBODIMENTS

Figure 1:
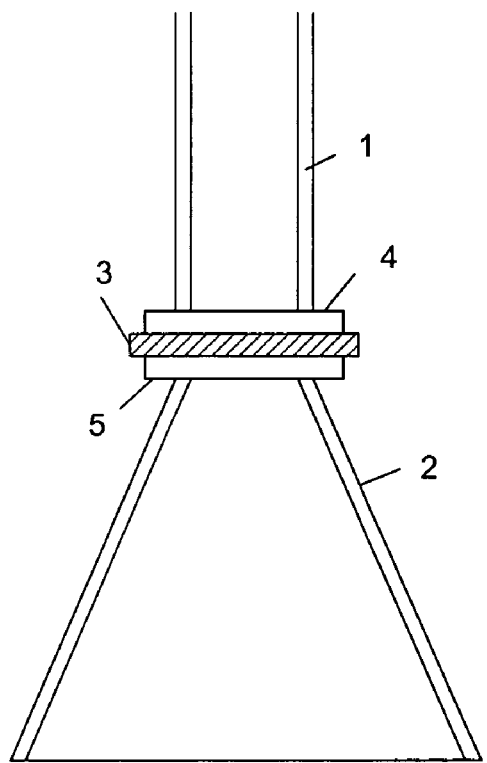
FIG. 1 shows the potential separation of a fill level radar according to an exemplary embodiment of the present invention.

In the following description of the figures the same reference characters are used for identical or similar elements.

FIG. 1 shows part of a fill level radar with potential separation according to an exemplary embodiment of the present invention. As shown in FIG. 1, the arrangement comprises a hollow conductor 1 (i.e. a waveguide) that is provided for conducting electromagnetic waves, an aerial 2 for transmitting and/or receiving electromagnetic waves, and a separation element 3 for insulating the aerial 2 from the hollow conductor 1. As is shown in FIG. 1, the separation element 3 is arranged directly at the aerial 2. To this effect the aerial 2 comprises a connecting element 5. The separation element 3 may, for example, be vapour deposited or deposited in some other way onto the connecting element 5. Of course, it may be also possible for the separation element 3 to be glued or clipped onto the connecting element, or to be attached in some other way.

The hollow conductor 1 comprises a second connecting element 4, which is arranged on the other side of the separation element 3.

The separation element may be designed in the form of a dielectric barrier that comprises a layer of a solid dielectric material. To this effect the thickness of the separation element 3 may be adequate to provide sufficient electrical insulation. For example, the thickness may be dimensioned such that only from a certain maximum voltage between the hollow conductor 1 and the aerial 2 does noticeable current conduction take place between these two elements 1, 2 by way of the separation element 3. A typical thickness for such a separation element 3 is for example 0.5 mm. Of course, the separation element 3 can also be considerably thicker or (e.g. if the maximum voltage is lower) it can be thinner.

The hollow conductor 1 is used for conducting electromagnetic waves, in particular microwaves of a frequency of, for example, 6 to 85 GHz. Of course the hollow conductors 1 and the aerial 2 can also be designed for conducting or detecting or transmitting electromagnetic radiation at higher frequencies. Furthermore, conducting, detecting or transmitting electromagnetic radiation with a frequency that is lower than 6 GHz may also be possible.

The hollow conductor 1 may for example comprise a round or rotationally symmetrical cross section. Furthermore, the hollow conductor 1 may comprise an angular cross section (rectangular or polygonal) or some completely different cross section.

Moreover, the hollow conductor can be air-filled or can comprise a filling of dielectric material.

The connection between the hollow conductor 1 and the separation element 3, and/or between the separation element 3 and the aerial 2, is designed such that the hollow conductor 1 and the aerial 2 are held so as to be rotatable relative to each other. In this way even with the aerial (which is firmly connected to a flange in the cover of the fill level container) installed, subsequent rotary adjustment of the hollow conductor 1 (and thus of the housing, including the electronics, located thereon) relative to the aerial 2 may be possible. The aerial 2 and the sensor housing (not shown in FIG. 1) with built-in circuit can thus be rotated in relation to each other.

Furthermore, the connection between the separation element 3 and the upper connection element 4 or between the separation element 3 and the connection element 5 on the aerial side may be designed so as to be unclippable so that simple exchanging or separating or plugging together of the hollow conductor 1 and the aerial 2 may become possible.

Of course, the separation element 3 may also be firmly connected to the two connection elements 4, 5 so that any maladjustment or undesirable unclipping may be prevented.

In particular, the separation element 3 may ensure waterproof or even gasproof connection between the aerial 2 and the hollow conductor 1 so that materials transport between the aerial and thus the interior of a fill level container and the hollow conductor and thus the electronics connected to it or to the outside environment is prevented.

To this effect it may be possible, in a way that is customary for the average person skilled in the art, to provide seals, e.g. O-rings, at defined positions.

Furthermore, it may be ensured that the separation element does not excessively impede microwave propagation in the hollow conductor. To this effect it may be possible, by installing so-called $\lambda/4$ transformation lines, to optimize wave transition at the location of the separation element. In this arrangement the transformation line is a circumferential gap between the two metal parts that from both sides are adjacent to the separation element. The gap may be filled by the separation element and preferably has a radial extension of $\lambda/4$, with $\lambda$ designating the wavelength of the microwave guided in the gap. The open end of the gap on the outer circumference of the circle is transformed, by the transformation line, as a short circuit onto the inner circumference of the circle with the diameter of the hollow conductor. This short circuit replaces the hollow conductor wall that is absent as a result of the separation element.

Figure 2:
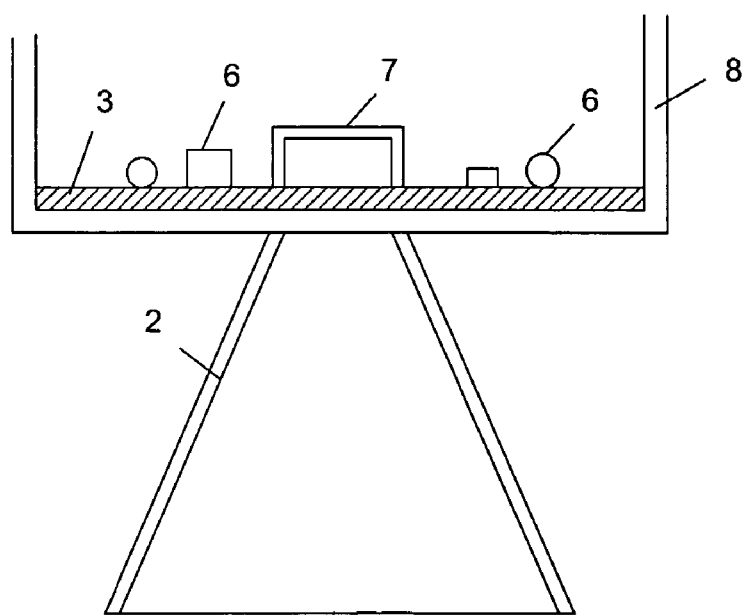
FIG. 2 shows the potential separation of an aerial according to a further exemplary embodiment of the present invention.

FIG. 2 shows an aerial arrangement with a separation element 3 according to a further exemplary embodiment of the present invention. In this arrangement a measuring circuit for measuring electromagnetic waves received by the aerial is combined with the separation element 3. In this arrangement the measuring circuit 6 comprises, for example, a plural number of SMD components that are mounted on the separation element. In this arrangement the cap 7 is used to close off the wave line. Furthermore, a housing 8 is provided, which protects the measuring circuit 6. The measuring circuit 6 is completely insulated from the aerial 2 by the separation element 3.

In this arrangement the separation element 3 not only serves the function of insulating but also, on the side facing away from the container, comprises strip conductors and soldering pads for the components of the measuring circuit. In the simplest case the separation element is a printed circuit board which however must not contain any through-plating so as not to cancel out the electrical insulation. Of course it is also possible to provide multilayer printed circuit boards with through-plating that does not conduct through all layers, so-called blind-hole through-plating.

Figure 3:
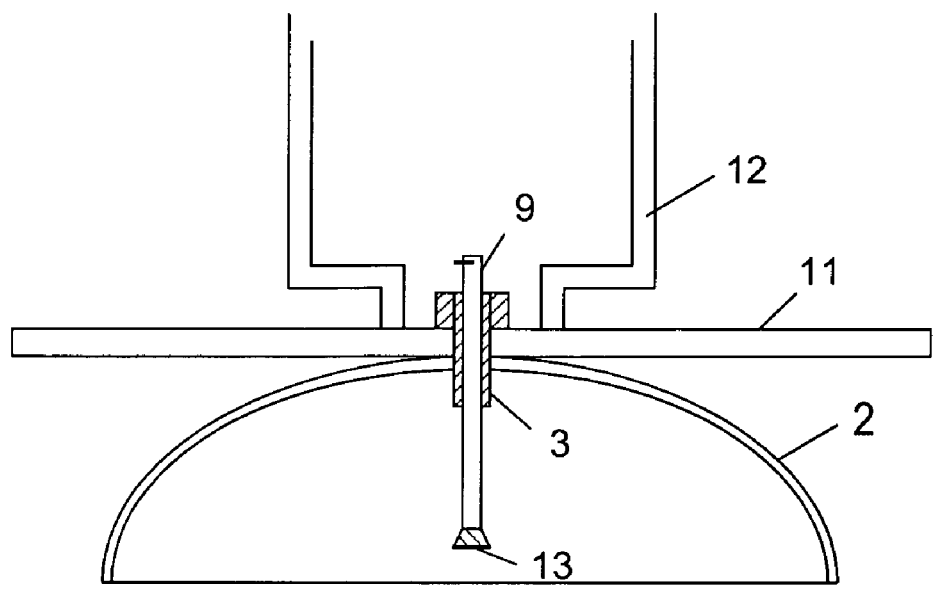
FIG. 3 shows the potential separation for a parabolic aerial according to a further exemplary embodiment of the present invention.

FIG. 3 shows an aerial arrangement for a fill level measuring device which comprises a parabolic aerial 2. In this arrangement the feed device comprises a hollow conductor 9, into which the signals to be transmitted are coupled in by way of a coupling-in pin. By way of the hollow conductor 9 the waves are guided to the counter reflector 13 from where they are radiated out in a focused manner, by way of reflection, via the parabolic reflector 2. In order to protect the feed device from the incoming container atmosphere it is common to fill the space between the lower end of the hollow conductor and the counter reflector by means of a dielectric body. This prevents gas and humidity from entering the hollow conductor 9. FIG. 3 also indicates that the parabolic aerial is connected with a flange 11 for installation in the container, and that a surrounding housing 12 for protecting the electronics (not shown) and the feed device is provided.

Furthermore, a tubular dielectric barrier 3 is provided, which partly encases the hollow conductor 9 which feeds the aerial, and insulates said hollow conductor 9 from the parabolic aerial 2 and the attachment flange 11 connected thereto.

Figure 4:
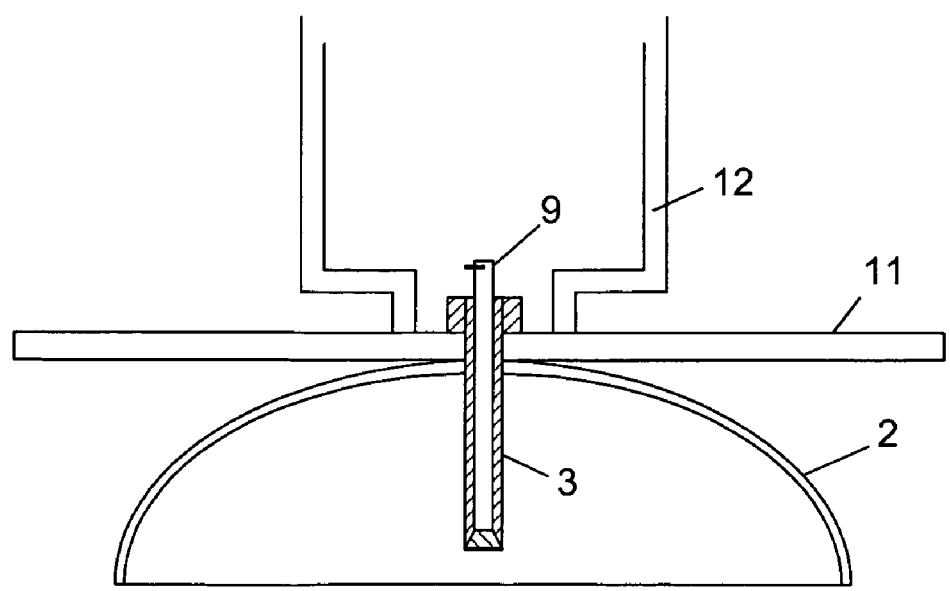
FIG. 4 shows further potential separation for a parabolic aerial according to a further exemplary embodiment of the present invention.

FIG. 4 shows an arrangement according to a further exemplary embodiment of the present invention, in which the part of the hollow conductor 9, which part protrudes into the parabolic aerial 2, is completely encased by the dielectric barrier 3. In this way the part of the hollow conductor 9, which part protrudes into the parabolic aerial 2, is completely insulated from the region of the flange 11, which region is located on the side of the aerial (thus for example from the internal region of a feed material container). Apart from electrical insulation, this protective layer can also provide effective protection against corrosion or other destruction of the hollow conductor 9. Furthermore, this encasing prevents any materials transport between the internal region of the fill level container and the external region of the fill level container.

Figure 5:
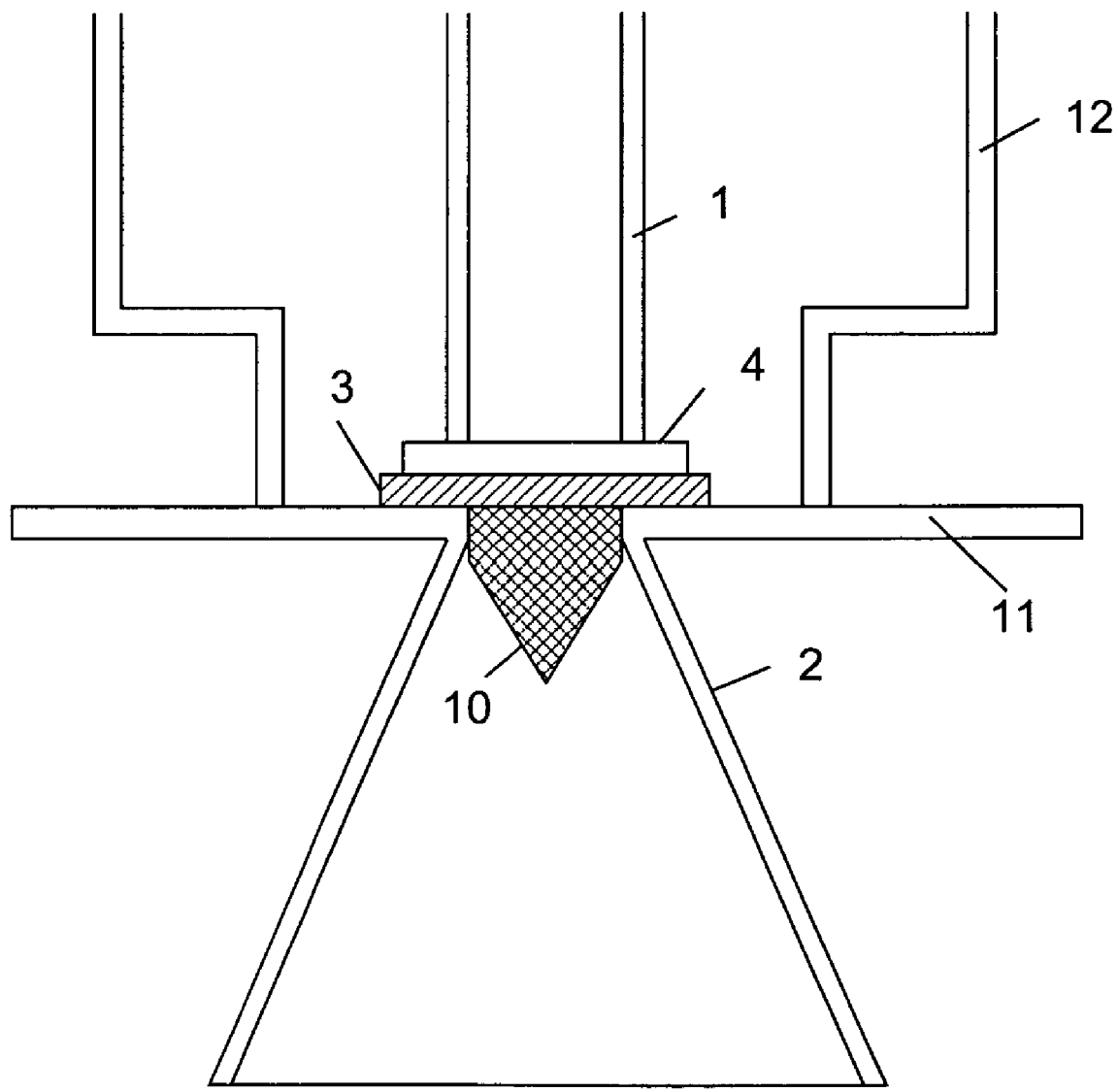
FIG. 5 shows the potential separation according to a further exemplary embodiment of the present invention.

FIG. 5 shows a further exemplary embodiment of an aerial according to the present invention. In this arrangement, apart from the separation element 3, the aerial 2 comprises an additional dielectric body 10, which extends into the aerial and tapers to a point. In the case of a round hollow conductor 1 this additional dielectric body 10 is conical in shape, while in the case of a hollow conductor 1 with a rectangular cross section it is pyramid shaped. In this way coupling between the hollow conductor 1 and the aerial 2 is enhanced, and the quality of the transmission, into the hollow conductor 1, of the electromagnetic signals detected by the aerial is improved. Furthermore, the point facilitates the dripping off of any condensate that may form, which arrangement enhances the signal quality and thus the measuring reliability. In this arrangement the separation element 3 and the second dielectric body 10 can be different bodies. However, they can also comprise a continuous piece so that at the same time insulation and improved coupling are provided.

The invention may particularly be well suited to fill level measuring devices, however it is in no way limited to this field of application. It can be used wherever aerials for transmitting or receiving electromagnetic waves have to be insulated from a corresponding feed device.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

What is claimed is:

1. A fill level radar with potential separation for determining the fill level in a tank, the fill level radar comprising:
   an aerial for at least one of transmitting and receiving electromagnetic waves;
   a feed device for feeding the electromagnetic waves to the aerial;
   a separation element for electrically isolating the aerial from the feed device;
   wherein the separation element is arranged directly at the aerial.

2. A fill level radar with potential separation for determining the fill level in a tank, the fill level radar comprising:
   an aerial for at least one of transmitting and receiving electromagnetic waves;
   a feed device for feeding the electromagnetic waves to the aerial; and
   a separation element for isolating the aerial from the feed device;
   wherein the separation element is arranged directly at the aerial, and
   wherein the separation element is designed to electrically insulate the aerial from the feed device up to a defined voltage.

3. A fill level radar with potential separation for determining the fill level in a tank, the fill level radar comprising:
   an aerial for at least one of transmitting and receiving electromagnetic waves;
   a feed device for feeding the electromagnetic waves to the aerial; and
   a separation element for isolating the aerial from the feed device;
   wherein the separation element is arranged directly at the aerial, and
   wherein the separation element is designed to thermally insulate the aerial from the feed device.

4. The fill level radar according to one of the claims 1, wherein the feed device comprises a waveguide and a radiation source; wherein the radiation source is designed to generate the electromagnetic waves; and wherein the waveguide is designed to conduct the electromagnetic waves from the radiation source to the aerial.

5. The fill level radar according to one of the claims 1, wherein the separation element comprises a dielectric.

6. The fill level radar according to claim 5, wherein the separation element is a dielectric barrier, comprising a layer of solid dielectric material.

7. A fill level radar with potential separation for determining the fill level in a tank, the fill level radar comprising:
   an aerial for at least one of transmitting and receiving electromagnetic waves;
   a feed device for feeding the electromagnetic waves to the aerial; and
   a separation element for isolating the aerial from the feed device;
   wherein the separation element is arranged directly at the aerial, and
   wherein a connection between the separation element and the feed device or between the separation element and the aerial is made in such a way that the feed device is held so as to be rotatable relative to the aerial.

8. A fill level radar with potential separation for determining the fill level in a tank, the fill level radar comprising:
   an aerial for at least one of transmitting and receiving electromagnetic waves;
   a feed device for feeding the electromagnetic waves to the aerial; and
   a separation element for isolating the aerial from the feed device;
   wherein the separation element is arranged directly at the aerial, and
   wherein the connection between the separation element and the feed device or between the separation element and the aerial is designed so that the feed device is unclippable from the aerial.

9. The fill level radar according to claim 1, wherein the connection between the separation element and the feed device or between the separation element and the aerial is gasproof or waterproof.

10. A fill level radar with potential separation for determining the fill level in a tank, the fill level radar comprising:
an aerial for at least one of transmitting and receiving electromagnetic waves;
a feed device for feeding the electromagnetic waves to the aerial;
a separation element for isolating the aerial from the feed device; and
a measuring circuit for measuring electromagnetic waves received by the aerial;
wherein the separation element is arranged directly at the aerial, and
wherein the measuring circuit is at least partially combined with the separation element.

11. The fill level radar according to claim 1, wherein the aerial is designed as a horn aerial or a parabolic aerial.

12. The fill level radar according to claim 4, wherein the waveguide is designed as a round hollow conductor or a rectangular waveguide.

13. The fill level radar according to claim 1, wherein the aerial is designed as a parabolic aerial; wherein the feed device comprises a wave guide with a first region;
wherein the first region of the waveguide protrudes into the parabolic aerial; and wherein the separation element partly encases the waveguide.

14. The fill level radar according to claim 13, wherein the separation element completely encases the first region of the waveguide.

15. An aerial for at least one of transmitting and receiving electromagnetic waves;
wherein the aerial comprises a separation element for electrically insulating the aerial from a feed device;
wherein the feed device is designed for feeding the aerial with the electromagnetic waves.

16. An aerial for at least one of transmitting and receiving electromagnetic waves;
wherein the aerial comprises a separation element for insulating the aerial from a feed device,
wherein the feed device is designed for feeding the aerial with the electromagnetic waves, and
wherein the separation element is designed to electrically insulate the aerial from the feed device up to a defined voltage.

17. An aerial for at least one of transmitting and receiving electromagnetic waves
wherein the aerial comprises a separation element for insulating the aerial from a feed device,
wherein the feed device is designed for feeding the aerial with the electromagnetic waves, and
wherein the separation element is designed to thermally insulate the aerial from the feed device.

18. The aerial according to claim 15, wherein the separation element comprises a dielectric.

19. The aerial according to claim 15, wherein the separation element is a dielectric barrier, comprising a layer of solid dielectric material.

20. An aerial for at least one of transmitting and receiving electromagnetic waves;
wherein the aerial comprises a separation element for insulating the aerial from a feed device,
wherein the feed device is designed for feeding the aerial with the electromagnetic waves, and
wherein a connection between the separation element and the feed device or between the separation element and the aerial is made in such a way that the feed device is held so as to be rotatable relative to the aerial.

21. An aerial for at least one of transmitting and receiving electromagnetic waves;
wherein the aerial comprises a separation element for insulating the aerial from a feed device,
wherein the feed device is designed for feeding the aerial with the electromagnetic waves, and
wherein the connection between the separation element and the feed device or between the separation element and the aerial is designed so that the feed device is unclippable from the aerial.

22. The aerial according to claim 15, wherein the connection between the separation element and the feed device or between the separation element and the aerial is gasproof or waterproof.

23. An aerial for at least one of transmitting and receiving electromagnetic waves, comprising:
a measuring circuit for measuring electromagnetic waves received by the aerial;
wherein the aerial comprises a separation element for insulating the aerial from a feed device,
wherein the feed device is designed for feeding the aerial with the electromagnetic waves, and
wherein the measuring circuit is at least partially combined with the separation element.

24. The aerial according to claim 15, wherein the aerial is designed as a horn aerial or a parabolic aerial.

25. A method for determining the fill level in a tank, the method comprising the steps of:
feeding electromagnetic waves to an aerial through a feed device;
at least one of transmitting and receiving the electromagnetic waves through the aerial;
electrically insulating the aerial from the feed device by means of a separation element;
wherein the separation element is arranged directly at the aerial.

26. The method according to claim 25, further comprising the steps of: generating the electromagnetic waves by a radiation source; conducting the electromagnetic waves from the radiation source to the aerial through a waveguide; wherein the feed device comprises the waveguide and the radiation source.

27. A method for determining the fill level in a tank, the method comprising the steps of:
feeding electromagnetic waves to an aerial through a feed device;
at least one of transmitting and receiving the electromagnetic waves through the aerial;
insulating the aerial from the feed device by means of a separation element; and
measuring, by way of a measuring circuit, the electromagnetic waves received by the aerial;
wherein the separation element is arranged directly at the aerial, and wherein the measuring circuit is at least partly combined with the separation element.

* * * * *